United States Patent
Soubaras

(10) Patent No.: US 9,696,443 B2
(45) Date of Patent: *Jul. 4, 2017

(54) METHOD AND DEVICE FOR PROCESSING SEISMIC DATA

(71) Applicant: CGG SERVICES SA, Massy (FR)

(72) Inventor: Robert Soubaras, Orsay (FR)

(73) Assignee: CGG SERVICES SAS, Massy (FR)

( * ) Notice: Subject to any disclaimer, the term of this patent is extended or adjusted under 35 U.S.C. 154(b) by 386 days.

This patent is subject to a terminal disclaimer.

(21) Appl. No.: 14/322,213

(22) Filed: Jul. 2, 2014

(65) Prior Publication Data
US 2014/0313854 A1      Oct. 23, 2014

Related U.S. Application Data

(63) Continuation of application No. 13/464,109, filed on May 4, 2012, now Pat. No. 8,811,112, which is a (Continued)

(30) Foreign Application Priority Data

Jan. 15, 2010 (FR) ...................................... 10 50278

(51) Int. Cl.
| | |
|---|---|
| G01V 1/38 | (2006.01) |
| G01V 1/34 | (2006.01) |
| G01V 1/28 | (2006.01) |

(52) U.S. Cl.
CPC .............. *G01V 1/345* (2013.01); *G01V 1/28* (2013.01); *G01V 1/38* (2013.01); *G01V 2210/51* (2013.01)

(58) Field of Classification Search
CPC . G01V 1/28; G01V 1/38; G01V 1/345; G01V 2210/51
(Continued)

(56) References Cited

U.S. PATENT DOCUMENTS

| | | |
|---|---|---|
| 2,614,165 A | 10/1952 | Doolittle |
| 3,299,399 A | 1/1967 | Bowers |

(Continued)

FOREIGN PATENT DOCUMENTS

| | | |
|---|---|---|
| EP | 0365270 A2 | 4/1990 |
| EP | 1426786 A1 | 6/2004 |

(Continued)

OTHER PUBLICATIONS

US 6,456,564, 09/2002, Grall et al. (withdrawn)
(Continued)

*Primary Examiner* — Daniel L Murphy
(74) *Attorney, Agent, or Firm* — Patent Portfolio Builders PLLC

(57) ABSTRACT

Apparatus, computer instructions and method for processing seismic data related to a subsurface of a body of water. The method includes inputting data indicative of recordings made by detectors disposed on a depth-changing profile in response to an acoustic wave reflected from the subsurface; applying a matched mirror migration procedure to the data, wherein the matched mirror migration procedure uses an up-traveling U wave and a down-traveling D wave, at least one of the up-traveling U wave or the down-traveling D wave being constructed based on (i) actual positions of the detectors disposed on the depth-changing profile and corresponding recordings, and (ii) fictitious mirror positions of the actual detectors on the depth-changing profile and corresponding recordings with a changed sign; and generating in a processor an image of the subsurface based on the matched mirror migration procedure.

15 Claims, 11 Drawing Sheets

Related U.S. Application Data continuation of application No. 13/008,099, filed on Jan. 18, 2011, now Pat. No. 8,792,299.

(60) Provisional application No. 61/393,008, filed on Oct. 14, 2010.

(58) Field of Classification Search
USPC .................................................. 367/21, 24
See application file for complete search history.

(56) References Cited

U.S. PATENT DOCUMENTS

| | | |
|---|---|---|
| 3,491,848 A | 1/1970 | Giles |
| 3,885,515 A | 5/1975 | Caldwell, Jr. et al. |
| 4,068,208 A | 1/1978 | Rice, Jr. et al. |
| 4,101,866 A | 7/1978 | Ruehle |
| 4,233,677 A | 11/1980 | Brown et al. |
| 4,254,480 A | 3/1981 | French |
| 4,353,121 A | 10/1982 | Ray et al. |
| 4,404,664 A | 9/1983 | Zachariadis |
| 4,486,863 A | 12/1984 | French |
| 4,486,865 A | 12/1984 | Ruehle |
| 4,532,617 A | 7/1985 | Baecker et al. |
| 4,581,723 A | 4/1986 | Savit |
| 4,635,236 A | 1/1987 | Roberts |
| 4,872,144 A | 10/1989 | Young et al. |
| 4,884,249 A | 11/1989 | Snook |
| 4,979,150 A | 12/1990 | Barr |
| 4,992,992 A | 2/1991 | Dragoset, Jr. |
| 5,111,399 A | 5/1992 | Armitage |
| 5,257,241 A | 10/1993 | Henderson et al. |
| 5,930,731 A | 7/1999 | Brzostowski |
| 5,959,938 A | 9/1999 | Behrens |
| 6,021,094 A | 2/2000 | Ober et al. |
| 6,024,344 A | 2/2000 | Buckley et al. |
| 6,049,507 A | 4/2000 | Allen |
| 6,088,299 A | 7/2000 | Erath et al. |
| 6,317,695 B1 | 11/2001 | Zhou et al. |
| 6,456,565 B1 | 9/2002 | Grall et al. |
| 6,574,567 B2 | 6/2003 | Martinez |
| 6,754,590 B1 | 6/2004 | Moldoveanu |
| 6,775,618 B1 | 8/2004 | Robertsson et al. |
| 7,372,769 B2 | 5/2008 | Grion |
| 7,400,552 B2 | 7/2008 | Moldoveanu et al. |
| 7,417,924 B2 | 8/2008 | Vigen et al. |
| 7,599,798 B2 | 10/2009 | Beasley et al. |
| 7,660,189 B2 | 2/2010 | Vigen et al. |
| 8,374,053 B2 | 2/2013 | Seale et al. |
| 8,792,299 B2 * | 7/2014 | Soubaras ............... G01V 1/28 367/15 |
| 2005/0027454 A1 | 2/2005 | Vaage et al. |
| 2006/0239122 A1 | 10/2006 | Vigen et al. |
| 2007/0165486 A1 | 7/2007 | Moldoveanu et al. |
| 2007/0189374 A1 | 8/2007 | Comparsi De Castro et al. |
| 2008/0253225 A1 | 10/2008 | Welker et al. |
| 2008/0279045 A1 | 11/2008 | Vigen et al. |
| 2008/0300821 A1 | 12/2008 | Frank et al. |
| 2009/0161488 A1 | 6/2009 | Ferber et al. |
| 2009/0175124 A1 | 7/2009 | Sorli |
| 2009/0231953 A1 | 9/2009 | Welker et al. |
| 2009/0323467 A1 | 12/2009 | Goujon et al. |
| 2010/0002537 A1 | 1/2010 | Welker |
| 2010/0054082 A1 | 3/2010 | McGarry et al. |
| 2010/0135112 A1 | 6/2010 | Robertsson |
| 2011/0305109 A1 | 12/2011 | Soubaras |
| 2012/0092956 A1 | 4/2012 | Soubaras |
| 2012/0213033 A1 | 8/2012 | Soubaras |
| 2012/0218858 A1 | 8/2012 | Soubaras |
| 2012/0224454 A1 | 9/2012 | Soubaras |

FOREIGN PATENT DOCUMENTS

| | | |
|---|---|---|
| EP | 2352040 A2 | 8/2011 |
| FR | 2955397 A1 | 7/2011 |
| FR | 2961316 A1 | 12/2011 |
| GB | 1588462 A | 4/1981 |
| GB | 2425839 A | 11/2006 |
| WO | 2007006785 A2 | 1/2007 |
| WO | 2011086166 A1 | 7/2011 |

OTHER PUBLICATIONS

Dan Ebrom et al.; Facilitating Technologies for Permanently Instrumented Oil Fields; The Leading Edge; vol. 19, No. 3; Mar. 2000; XP002590895; pp. 282-285.

French Preliminary Search Report mailed on Jul. 8, 2010 and issued in French Application No. 1050278.

French Opinion mailed on Jul. 8, 2010 and issued in French Application No. 1050278.

Jim Leinbach; "Wiener Spiking Deconvolution and Minimum-phase Wavelets: a Tutorial", The Leading Edge, vol. 14, No. 3 pp. 189-192, Mar. 1995.

Robert Soubaras, "Variable-depth streamer: deep towing and efficient deghosting for extended bad with" Aug. 2010.

Robert Soubaras, "Deghosting by joint deconvolution of a migration and a mirror migration" Aug. 2010, SEG Denver 2010 Annual Meeting.

International Search Report mailed on Sep. 19, 2011 and issued in application No. PCT/EP2011/059528.

Written Opinion of the International Search Authority mailed on Sep. 19, 2011 and issued in application No. PCT/EP2011/059528.

Daniel Trad Interpolation and multiple attenuation with migration operators' Geophysics, SEG, vol. 68, No. 6, Nov.-Dec. 2003, pp. 2043-2054.

International Search Report mailed on Aug. 31, 2012 in related application No. PCT/EP2011/068031.

International Search Report mailed on Apr. 21, 2011 in related application No. PCT/EP2011/050480.

US Office Action mailed on Aug. 13, 2012 in related U.S. Appl. No. 13/471,561.

US Office Action mailed on Aug. 15, 2012 in related U.S. Appl. No. 13/464,126.

US Office Action mailed on Aug. 17, 2012 in related U.S. Appl. No. 13/155,778.

US Office Action mailed on Aug. 8, 2012 in related U.S. Appl. No. 13/008,099.

GB Search Report mailed on Nov. 11, 2011 in related Application No. GB1117501.5.

R. Soubaras, et al.; "Variable Depth Streamer Acquisition: Enhancing Interpretation with broadband marine seismic"; GeoConvention 2012; May 2012, Vision.

M. Wong, et al.; "Least-squares Reverse Time Migration/Inversion for Ocean Bottom Data; a Case Study"; 2011 SEG Annual Meeting; Sep. 18-23, 2011 , San Antonio, Texas.

M. Wong, et al.; "Joint least-squares inversion of up- and down-going signal for ocean bottom data sets"; SEG Technical Program Expanded Abstracts 2010; Oct. 17-22, 2010 , Denver, Colorado; pp. 2752-2756.

U.S. Office Action issued on Jan. 7, 2013 in related U.S. Appl. No. 13/464,149.

U.S. Office Action issued on Dec. 6, 2012 in related U.S. Appl. No. 13/155,778.

U.S. Office Action issued on Dec. 6, 2012 in related U.S. Appl. No. 13/464,126.

U.S. Final Office Action issued Feb. 4, 2013 in related U.S. Appl. No. 13/471,561.

Danish Patent and Trademark Office, Signapore Written Opinion mailed Oct. 15, 2013, in corresponding Singapore Application No. 201205048-0.

Danish Patent and Trademark Office, Signapore Search Report mailed Oct. 15, 2013, in corresponding Singapore Application No. 201205048-0.

Boyce, et al., "Elementary Differential Equations and Boundary Value Problems", 1965, pp. 310-311 and 314, John Wiley & Sons, Inc.

(56) References Cited

OTHER PUBLICATIONS

Office Action in corresponding Canadian Patent Application No. 2,786,501 dated Oct. 17, 2016.

* cited by examiner

METHOD AND DEVICE FOR PROCESSING SEISMIC DATA

CROSS REFERENCE TO RELATED APPLICATIONS

The present application is a continuation of U.S. patent application Ser. No. 13/464,109, filed on May 4, 2012, having the title "Method and Device for Processing Seismic Data", and being authored by R. Soubaras, which Is a continuation of U.S. patent application Ser. No. 13/008,099, filed on Jan. 18, 2011, having the title "Method and Device for Processing Seismic Data", and being authored by R. Soubaras, which claims the benefit of priority of French filed patent application serial no. FR1050278, having the title "Method to Process Marine Seismic Data", and being authored by R. Soubaras, and from U.S. Provisional Patent Application Ser. No. 61/393,008, having the title "Method and Device for Processing Seismic Data", and being authored by R. Soubaras, the entire contents of which are incorporated herein by reference.

BACKGROUND

Technical Field

Embodiments of the subject matter disclosed herein generally relate to methods and systems and, more particularly, to mechanisms and techniques for processing seismic data.

Discussion of the Background

During the past years, the interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill in order to avoid a dry well.

Marine seismic data acquisition and processing generate a profile (image) of the geophysical structure (subsurface) under the seafloor. While this profile does not provide an accurate location for the oil and gas, it suggests, to those trained in the field, the presence or absence of oil and/or gas. Thus, providing a high resolution image of the subsurface is an ongoing process for the exploration of natural resources, including, among others, oil and/or gas.

During a seismic gathering process, as shown in FIG. 1, a vessel 10 drags an array of acoustic detectors 12. Plural acoustic detectors 12 are disposed along a cable 14. Cable 14 together with its corresponding detectors 12 are sometimes referred to, by those skilled in the art, as a streamer 16. The vessel 10 may tow plural streamers 16 at the same time. The streamers may be disposed horizontally, i.e., lying at a constant depth $z_1$ relative to a surface 18 of the ocean. Also, the plural streamers 16 may form a constant angle (i.e., the streamers may be slanted) with respect to the surface of the ocean as disclosed in U.S. Pat. No. 4,992,992, the entire content of which is incorporated herein by reference. FIG. 2 shows such a configuration in which all the detectors 12 are provided along a slanted straight line 14 making a constant angle a with a reference horizontal line 30.

With reference to FIG. 1, the vessel 10 also drags a sound source 20 configured to generate an acoustic wave 22a. The acoustic wave 22a propagates downward and penetrates the seafloor 24, eventually being reflected by a reflecting structure 26 (reflector R). The reflected acoustic wave 22b propagates upwardly and is detected by detector 12. For simplicity, FIG. 1 shows only two paths 22a corresponding to the acoustic wave. However, the acoustic wave emitted by the source 20 may be substantially a spherical wave, e.g., it propagates in all directions starting from the source 20. Parts of the reflected acoustic wave 22b (primary) are recorded by the various detectors 12 (the recorded signals are called traces) while parts of the reflected wave 22c pass the detectors 12 and arrive at the water surface 18. Since the interface between the water and air is well approximated as a quasi-perfect reflector (i.e., the water surface acts as a mirror for the acoustic waves), the reflected wave 22c travels back towards the detector 12 as shown by wave 22d in FIG. 1. Wave 22d is normally referred to as a ghost wave because this wave is due to a spurious reflection. The ghosts are also recorded by the detector 12, but with a reverse polarity and a time lag relative to the primary wave 22b. The degenerative effect that ghost waves have on bandwidth and resolution of seismic measurements are known. In essence, interference between primary and ghost arrivals causes, among other problems, notches, or gaps, in the frequency content of the data recorded by the detectors.

The traces may be used to determine the subsurface (i.e., earth structure below surface 24) and to determine the position and presence of reflectors 26. However, the ghosts disturb the accuracy of the final image of the subsurface and for at least this reason, various methods exist for removing the ghosts, i.e., deghosting, from the results of a seismic analysis. Further, the actual measurements need to be processed for obtaining the correct position of the various parts (reflectors) of the subsurface. Such a processing method is the migration.

The migration ignores the presence of ghosts, i.e., it assumes that the ghosts are not present. However, a real migration cannot be based on this assumption. For this reason, the ghosts need to be removed, mathematically, before applying the migration process.

The ghost information may also be used to determine a final image of the subsurface. When using the ghost information, the primaries are imperfectly aligned while the ghosts are aligned and thus, the ghost information is determining the positions of the reflectors. For this reason, this processing is called in the art mirror migration and this process is described, for example, in: "*Facilitating technologies for permanently instrumented oil fields*", Ebrom et al., The Leading Edge, Vol. 19, No 3, pp. 282-285, March 2000, the entire content of which is incorporated herein by reference. It is noted that during the mirror migration, the primary information is not used, which is the opposite of the migration process.

Based on a first final image produced by the migration process and a second final image produced by the mirror migration, a final combined image may be obtained by adding the two images together. In other words, FIG. 3 illustrates a traditional processing of seismic data. In step 40, seismic data are collected by firing the sound source and recording the received signals at the detectors. In step 42, the primaries are aligned which results in the ghosts being filtered out or reduced. Thus, mainly the primaries are used to migrate the data from the apparent position to the real position. Based on the results of the migration step, a final image A of the subsurface is generated in step 44. This final image may be used by those interested as is.

An alternative path for generating a final image is to use the mirror migration algorithm in step 46. In this step the ghosts are aligned which results in the primaries being filtered out or reduced. Thus, mainly the ghosts are used to migrate the data in the mirror migration. A different final image B is generated in step 48. This final image may be used by those interested as is. It is noted that each of steps 42 and 46 are processor intensive as a large number of equations have to be solved for taking into account the traces or the ghosts. A better final image C may be obtained in step 50 if the final image A is added to final image B.

The above processing was discussed assuming that the detectors are provided at the same depth relative to the surface of the water. However, there are situations when the detectors are provided on slanted streamers, i.e., each detector has its own depth. For these situations, a supplementary step 52 may be necessary as shown in FIG. 3. This step is called in the art "datuming." Datuming is a processing method in which, using the data from N seismic detectors provided at positions $(x_n, z_n)$, where n=1, . . . N and N is a natural number, a synthesis is made of the data that would have been recorded by the seismic detectors if they had been placed at the same horizontal positions $x_n$ but at the same constant reference depth $z_0$ for all the seismic detectors.

Datuming is one dimensional (1D), see for example, U.S. Pat. No. 4,353,121 (the entire content of which is incorporated herein by reference) when it is assumed that the seismic waves propagate vertically. In this case, the process is limited to applying a static shift to each time recorded by a given seismic detector, this static shift corresponding to the time of vertical propagation between the real depth $z_n$ of the n detector and the reference depth $z_0$.

However, the toll imposed by running, for example, the inverse propagation equations, twice, once for the primary in the migration process and once for the ghosts in the mirror migration process is large in terms of the time and computer power necessary to process the data. For understanding the computational power involved in the seismic data processing, it is noted that the migration is a process that can occupy for several weeks several tens of racks of computers, each rack including hundreds of processors.

Accordingly, it would be desirable to provide systems and methods that avoid the afore-described problems and drawbacks, e.g., shorten the amount of time necessary to produce the final image.

SUMMARY

According to an exemplary embodiment, there is a method for processing seismic data related to a subsurface of a body of water. The method includes a step of inputting data indicative of recordings made by detectors in response to an acoustic wave reflected from the subsurface; a step of applying a matched mirror migration procedure to the data, wherein (i) actual positions of the detectors and corresponding recordings, and (ii) fictitious mirror positions of the actual detectors and corresponding recordings with a changed sign are added in the matched mirror migration; and a step of generating a final image of the subsurface based on the matched mirror migration procedure.

According to still another exemplary embodiment, there is a method for processing seismic data related to a subsurface of a body of water. The method includes a step of inputting data indicative of recordings made by detectors in response to an acoustic wave reflected from the subsurface; a step of applying a reverse time migration procedure for calculating a final image of the subsurface, wherein the reverse time migration procedures solves the full acoustic wave equation; and a step of using free-surface boundary conditions for a surface of the water instead of absorbing boundary conditions to calculate the final image. The free-surface boundary conditions assume that a wave is reflected at the surface of the water while the absorbing boundary conditions assume that the wave moves from the water into air at the surface of the water.

According to still another exemplary embodiment, there is a computer program-implemented method for processing seismic data related to a subsurface of a body of water. The method includes inputting data indicative of recordings made by detectors in response to an acoustic wave reflected from the subsurface; applying a matched mirror migration procedure to the data, wherein (i) actual positions of the detectors and corresponding recordings, and (ii) fictitious mirror positions of the actual detectors and corresponding recordings with a changed sign are added in the matched mirror migration; and generating a final image of the subsurface based on the matched mirror migration procedure.

According to yet another exemplary embodiment, there is an apparatus for processing seismic data related to a subsurface of a body of water. The apparatus includes a processor programmed to perform the following method steps: receiving data indicative of recordings made by detectors in response to an acoustic wave reflected from the subsurface; applying a matched mirror migration procedure to the data, wherein (i) actual positions of the detectors and corresponding recordings, and (ii) fictitious mirror positions of the actual detectors and corresponding recordings with a changed sign are added in the matched mirror migration; and generating a final image of the subsurface based on the matched mirror migration procedure.

According to still another exemplary embodiment, there is a program storage device, readable by a computer, tangibly embodying a program of instructions executable by the computer for processing seismic data related to a subsurface of a body of water. The instructions include inputting data indicative of recordings made by detectors in response to an acoustic wave reflected from the subsurface; applying a matched mirror migration procedure to the data, wherein (i) actual positions of the detectors and corresponding recordings, and (ii) fictitious mirror positions of the actual detectors and corresponding recordings with a changed sign are added in the matched mirror migration; and generating a final image of the subsurface based on the matched mirror migration procedure.

According to another exemplary embodiment, there is a method for generating a final image of a subsurface of a body of water. The method includes inputting recordings of plural detectors in response to an acoustic wave reflected from the subsurface; applying a matched mirror migration procedure to the recordings, wherein (i) actual positions of the detectors and corresponding recordings, and (ii) fictitious mirror positions of the detectors and corresponding recordings with a changed sign are added in the matched mirror migration procedure; and generating the final image of the subsurface based on the matched mirror migration procedure.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
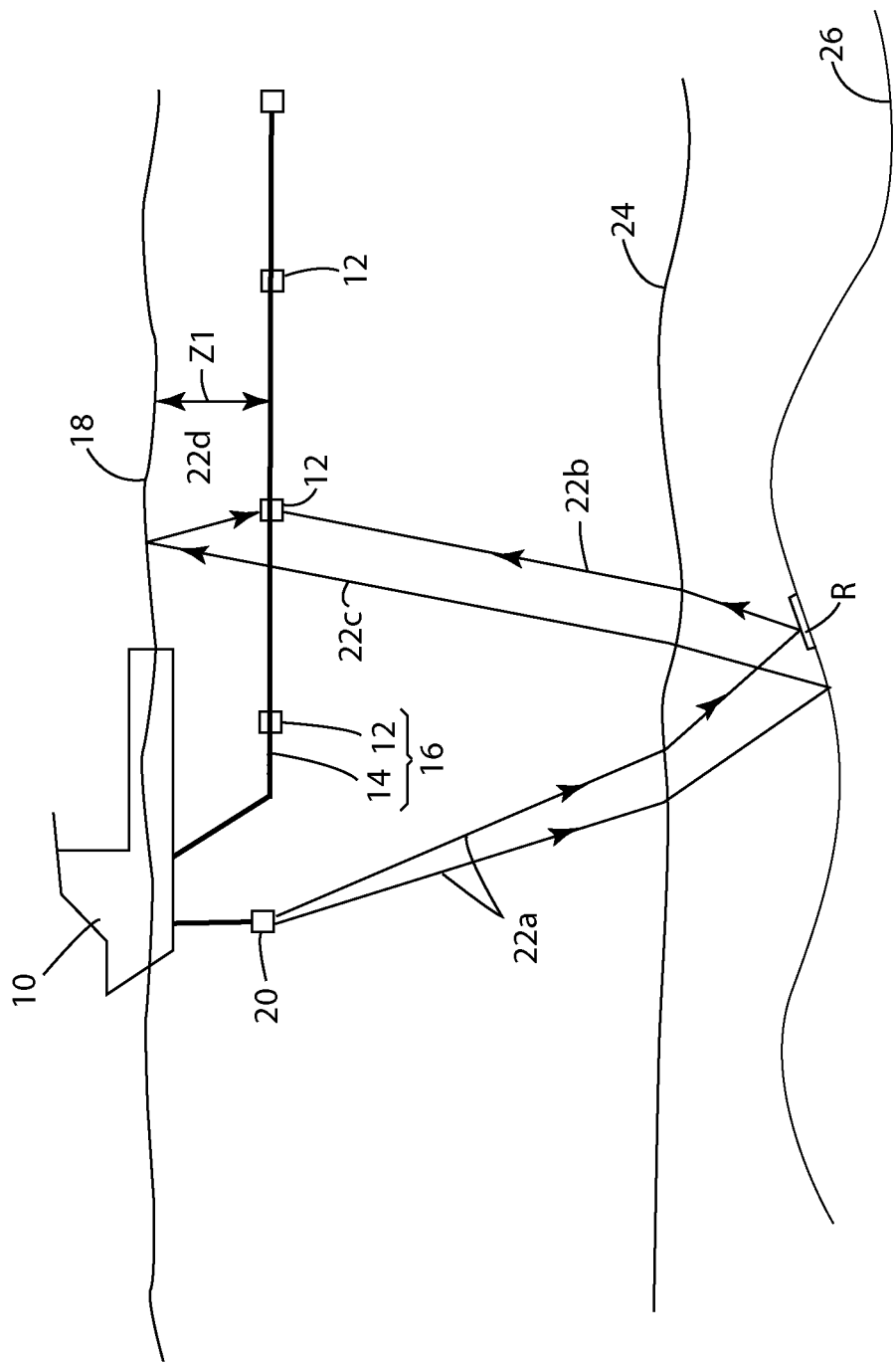
FIG. 1 is a schematic diagram of a conventional seismic data acquisition system having a horizontal streamer.
Figure 2:
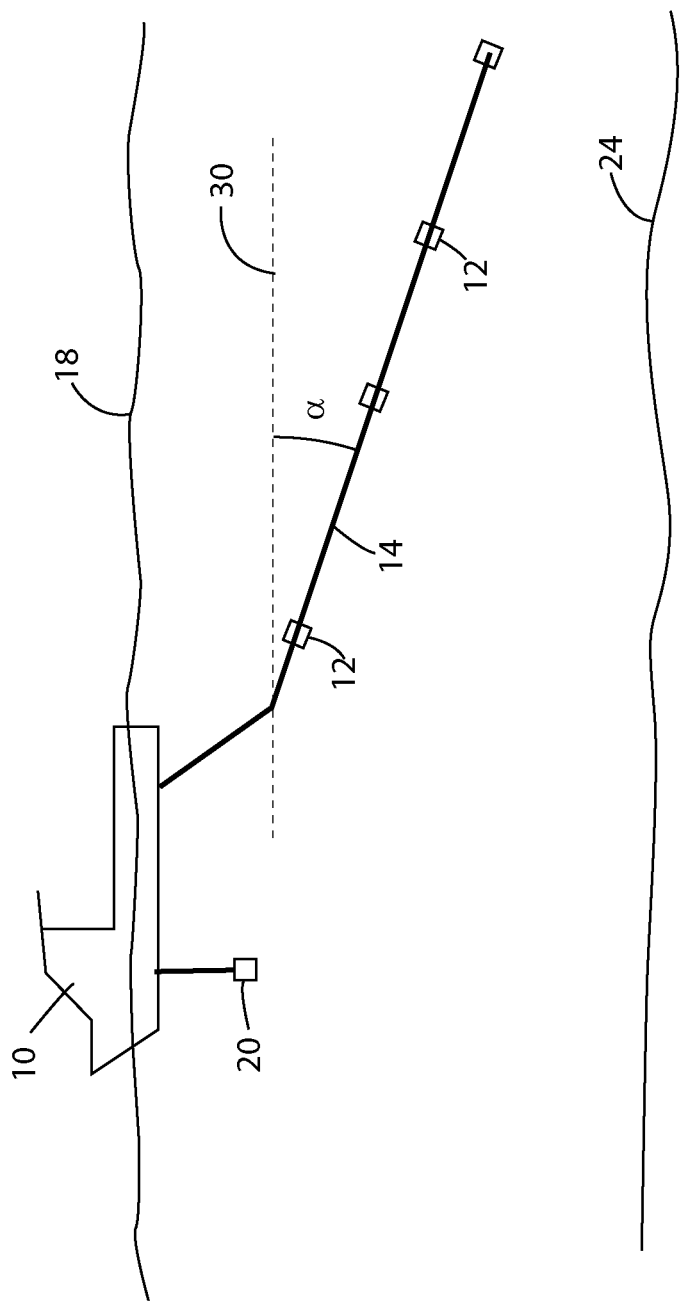
FIG. 2 is a schematic diagram of a conventional seismic data acquisition system having a slanted streamer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of migration, mirror migration and matched mirror migration processes for determining a final image of a substructure. However, the embodiments to be discussed next are not limited to these processes, but may be applied to other processes that are used for processing seismic data or other data related to the determination of the position of a structure that is not directly reachable for measurements.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a matched mirror migration processing is defined in such a way that a final image is generated by combining both the primaries and the ghost information during the processing without generating different images for the primaries and the ghosts. In another exemplary embodiment, no datuming step is performed on the data although the detectors are not provided at a same depth relative to the surface of the water. In still another exemplary embodiments, the data that is processed is collected using streamers having a curved profile, i.e., part of the detectors are not provided on a slanted streamer although they have varying depths relative to the surface of the water. These kinds of streamers were disclosed in French filed patent application of Serial No. FR1052576, entitled, Method and Device to Acquire Marine Seismic Data, the entire content of which is incorporated herein by reference, and also in U.S. Provisional Patent Application No. 61/392,982, Attorney Docket no. 100001/0336-001, entitled Method and Device to Acquire Seismic Data, the entire content of which is incorporated herein by reference. According to yet another exemplary embodiment, a 3D seismic processing is used for generating the final image of the subsurface without any restrictions regarding the direction of wave propagation. In this respect, it is noted that a 1D method assumes the sound waves travelling vertically (up and down) while a 2D method considers upward propagation (up-travelling waves) defined by propagation angles relative to the surface of the water in the range of 0° and 180° and downward propagation (down-travelling waves) defined by propagation angles of 180° to 360°.

The process of gathering marine seismic data has been discussed in U.S. Provisional Patent Application No. 61/392,982, entitled Method and Device to Acquire Seismic Data, and thus, this process is not repeated herein. Further, the above-identified application identified the possibility to gather data not only by using traditional streamers, i.e., the detectors lying along horizontal lines or along a slanted line, but also using novel streamers in which part of the detectors may lie on a curved profile or streamers that have multiple slanted sections, i.e., a depth-changing profile.

Figure 4:
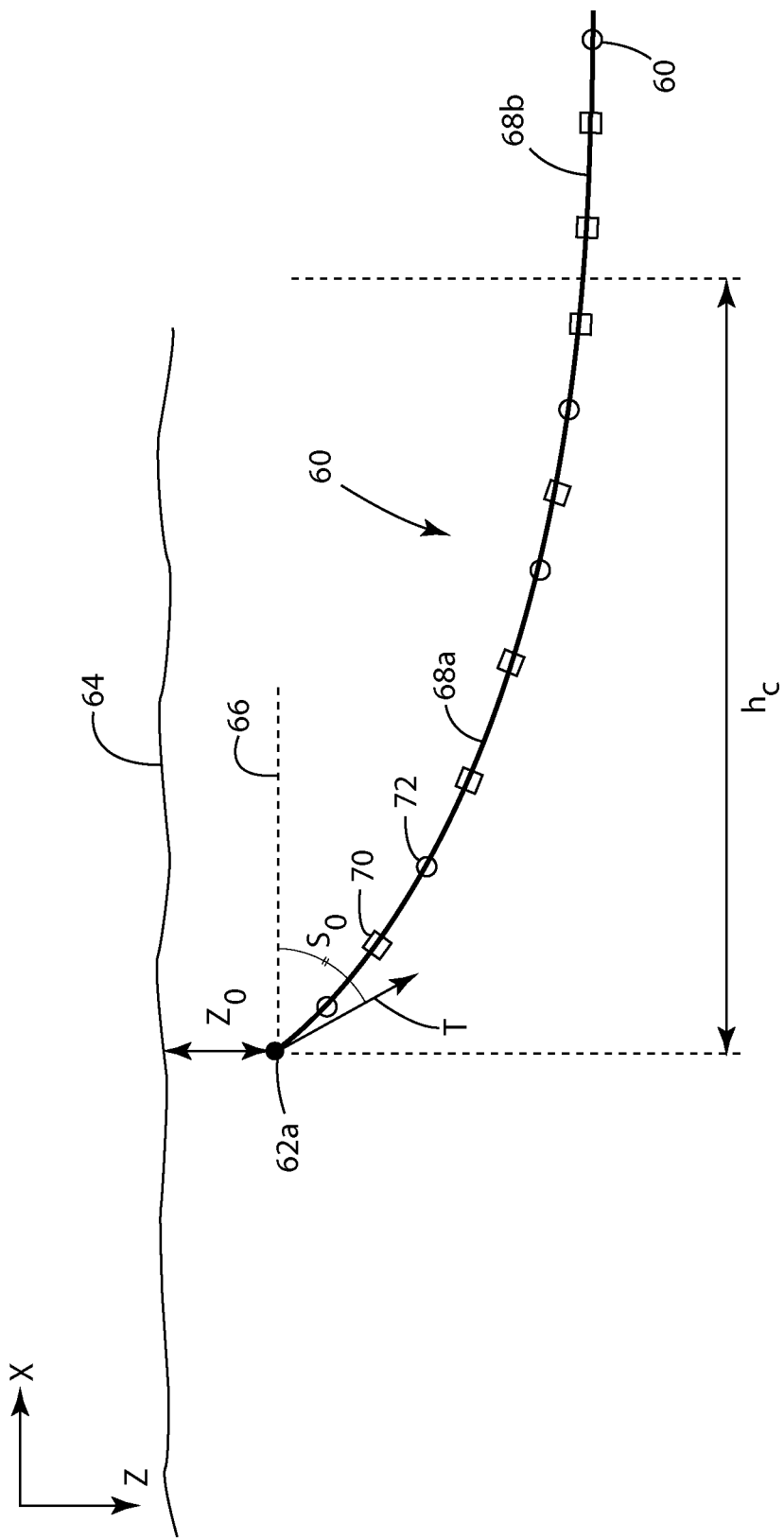
FIG. 4 is a schematic diagram of a novel streamer.

Such novel configuration is illustrated in FIG. 4, in which a streamer 60 has a curved profile defined by three parametric quantities, $z_0$, $s_0$ and $h_c$. It is noted that not the entire streamer has to have the curved profile. In other words, the curved profile should not be construed to always apply to the entire length of the streamer. While this situation is possible, the exemplary embodiments do not prohibit having the curved profile applied to only a portion of the streamer. The first parameter $z_0$ indicates the depth of the first detector 54a relative to the surface 58 of the water. This parameter may have a value in the range of meters to tens of meters. For example, $z_0$ may be around 6 m. However, as would be recognized by those skilled in the art, the value of $z_0$ depends on each application and may be related to the depth of the bottom of the ocean, the depth of the reflectors, the power of the sound source, etc.

The second parameter $s_0$ is related to the slope of the initial part of the streamer 52 relative to a horizontal line 64. The angle $s_0$ is illustrated in FIGS. 4 and it is determined by a tangent T to an initial part of the streamer and the horizontal line 64. It is noted that the slope of the curved profile at point 54a is given by a ratio of the change of the curved profile along the Z axis with respect to the change along the X axis. The slope is thus equal to the mathematical value of the tangent of the angle $s_0$, i.e., slope (at point 54a in FIG. 4)=tan ($s_0$). Further, it is noted that for small angles (e.g., five or less degrees), tan ($s_0$) is approximately equal to $s_0$, if the angle is expressed in radians and not in degrees. Thus, for small angles, the slope and the angle may be used interchangeably. In one embodiment, the value of $s_0$ may be between 0 and 6 degrees. The example shown in FIG. 4 has an initial angle $s_0$ equal to substantially 3 degrees. It is noted that the profile of the streamer 52 in FIG. 4 is not drawn to scale as an angle of 3 degrees is a relatively small quantity.

The third parameter $h_c$ indicates a horizontal length (distance along the X axis in FIG. 4 measured from the first detector 54a) of the curved portion of the streamer. This parameter may be in the range of hundreds to thousands of meters. For example, $h_c$ is around 3000 m for the configuration shown in FIG. 4. This parameter defines the end of the curved part of the streamer 52. In other words, the streamer 52 may have a first portion 52a that has a first curved profile and a second portion 52b that is either flat or has a different curved profile. Parameter $h_c$ defines the first portion 52a. It is noted that in one application the streamer 52 has both the first portion 52a and the second portion 52b while in another application the streamer 52 has only the first portion 52a. In other words, in some embodiments, the streamer does not extend along the entire curved profile, i.e., a length of the streamer projected on X axis is less than $h_c$.

According to another exemplary embodiment, the curved profile of the streamer 60 may be described, approximately, by the following equations:

$$z(h) = z_0 + s_0 h \left(1 - 0.5\left(\frac{h}{h_c}\right)\right) \text{ for } h \leq h_c, \text{ and} \quad (1)$$

$$z(h) = z_0 + s_0 \cdot 0.5 \cdot h_c \text{ for } h > h_c. \quad (2)$$

In these equations, z is measured along the Z axis and h is measured along the X axis, where Z is perpendicular to the surface of the water and X extends along the surface of the water. Also, it is noted that only equation (1) may be enough to define the shape of the streamer, depending on the length of the streamer. In other words, in some embodiments, the streamer does not have to have the flat portion. For these specific equations, it was found that the clarity of the images of the sub-surface improve substantially. Those skilled in the art would understand that the values provided by equations (1) and (2) are approximate as the detectors 70 are under constant motion exerted by various water currents and the movement of the vessel. In other words, it is understood that detectors that are provided substantially on the curved profile described by equation (1) and/or (2), e.g., at positions as close as 10 to 20% to the real curve in terms of the actual depth z(h), are envisioned to be covered by the above mentioned equations. The same is true for birds 72 that are configured to maintain the curved profile. The curved profile may be one of a parabola, a circle, a hyperbola or a combination of these shapes.

Although the curved profile streamer discussed above provides better results than the existing streamer profiles, the processing discussed in the following exemplary embodiments applies equally to the traditional streamer profiles (e.g., horizontal and/or slanted).

According to an exemplary embodiment, a processing method that uses a 3D migration per shot point will be described next. This 3D migration method is capable of obtaining an accurate image of the subsurface by taking an accurate account of wave propagation in complex media. The 3D migration method is achieved by taking into account the distance between various streamers that are towed at the same time by the vessel.

Figure 5:
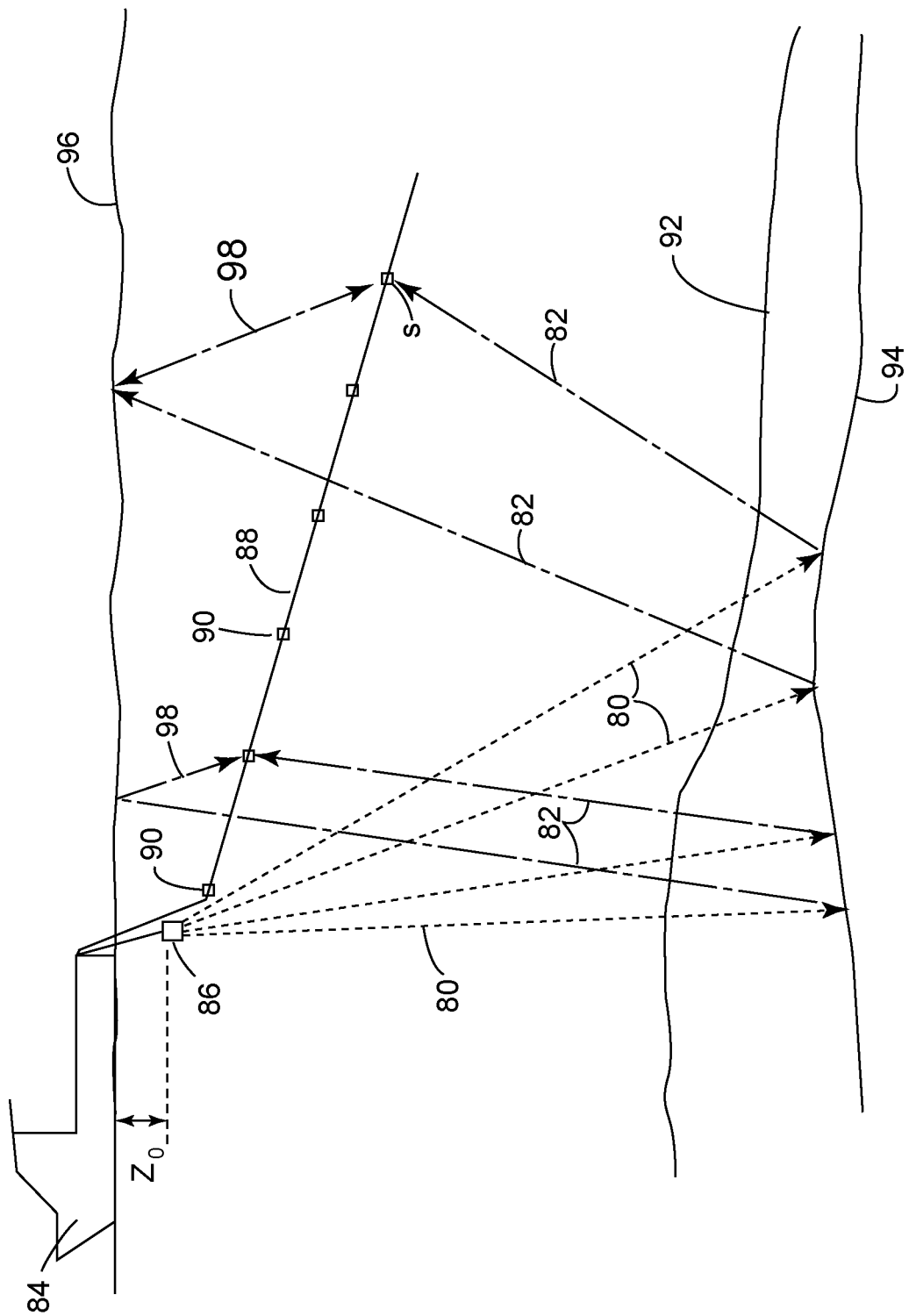
FIG. 5 is a flow chart illustrating the calculation of a final image for a migration process.

A conventional "one-way" migration method (so called because the full wave equation is not solved, but only the one-way wave equation) includes a step of synthesizing the incident wave from information of the seismic source, and synthesizing the reflected wave from data recorded by the detectors. FIG. 5 illustrates the incident wave 80 and the reflected wave 82. FIG. 5 also illustrates a vessel 84 having an acoustic source 86 and towing a streamer 88. The streamer 88 includes plural detectors 90 and the detectors are distributed on a slanted streamer. The incident waves 80 reach the bottom 92 of the ocean, where part of them are reflected. However, part of the incident waves continue to travel into the subsurface (structure under bottom 92) where they are reflected by various reflectors 94. At this point, a reflected wave 82 starts to propagate towards the surface 96 of the water. This reflected wave 82 travelling upwards is recorded by detectors 90. However, the reflected wave 82 further travels to the surface 96, where it is reflected by the surface of the water, thus forming the ghosts 98, which are also recorded by the detectors 90.

Figure 6:
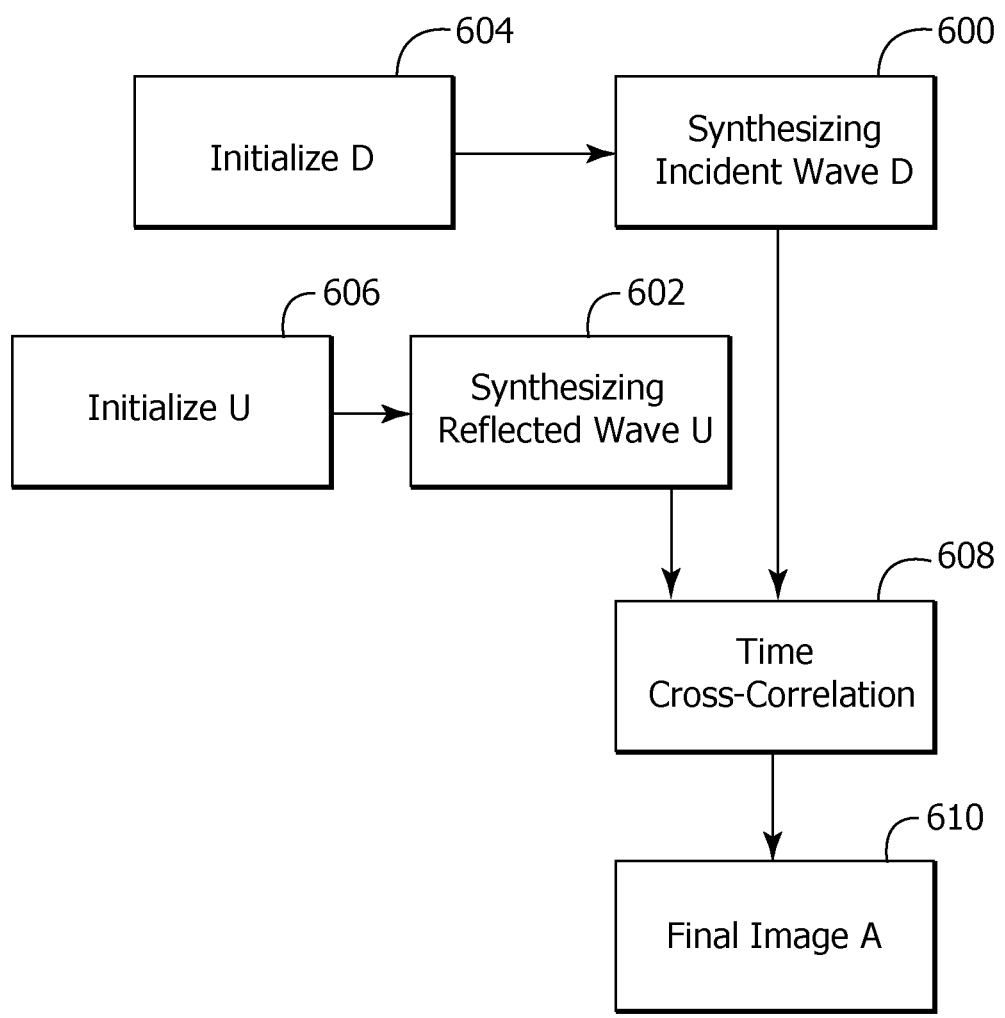
FIG. 6 illustrates up- and down-traveling waves used to calculate the final image of a subsurface.

The incident wave 80 (i.e., the wave emitted by the source 86) is assumed to be down-travelling and described by a mathematical function D. This incident wave D(x, y, z, t) depends on the position (x, y, z) and time t at any point in space. A migration process is illustrated in FIG. 6. As shown in FIG. 6, the incident wave D(x, y, z, t) is synthesized recursively in step 600 at depth z. The down-travelling wave is being initialized in step 604 at a depth of the seismic source $z_s$. Considering that there are n detectors, with n varying from 1 to N, where N is a predetermined natural number, the incident wave D at every depth $n\Delta z$ is then calculated recursively in step 600 by calculating the incident wave D(x, y, z+$\Delta z$, t) at a depth z+$\Delta z$ from the incident wave D(x, y, z, t) at depth z. This operation is performed until all the detectors of the streamer are taken into account.

Similarly, the reflected wave 82, which is described by a mathematical function U(x, y, z, t), is assumed to be up-travelling and it is initialized in step 606 of FIG. 6 at a depth z=$z_r$, where $z_r$ is a depth of the detectors if all the detectors have the same depth. If the detectors are distributed on a slanted streamer or on a streamer having a curved profile, the function U needs to be adjusted for each detector as discussed later. The reflected wave U in a given illumination volume (centred on the shot position, having two given horizontal extensions called x and y apertures and the maximum depth to be imaged as the vertical extension) is then calculated recursively in step 602 by calculating the up-travelling wave U(x, y, z+$\Delta z$, t) at a depth z+$\Delta z$ from the up-travelling wave U(x, y, z, t) at a depth z.

An image A for this migration process is calculated in step 608 by the time cross-correlation of the two volumes determined by D(x, y, z, t) and U(x, y, z, t) in steps 600 and 602. In step 610, the final image A of the migration process is generated. The final image A may be printed on an appropriate medium, displayed on a monitor or stored in a storing device.

The altimetry of the detectors, i.e., the fact that the source and the detectors may have non-zero depths relative to each other may be taken into account by adding the sources and the detectors at a corresponding z throughout the recursive calculations. For example, a detector provided at a depth $z_r$, lying between $n\Delta z$ and $(n+1)\Delta z$ is added during the recursive calculation of $U((n+1)\Delta z)$ from $U(n\Delta z)$.

Figure 7:
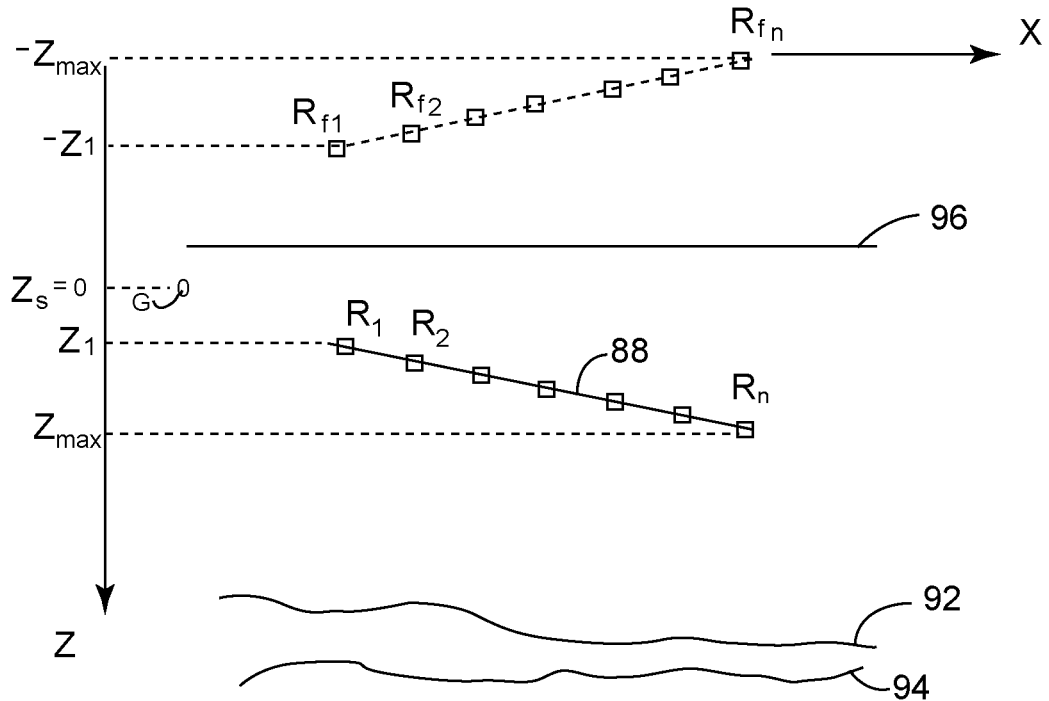
FIG. 7 illustrates the provision of fictitious detectors for an matched mirror migration process according to an exemplary embodiment.

For the mirror migration, the process is similar to that described in FIG. 6 of the migration with some changes. Assume that the detectors R1 to RN are provided on a slanted streamer 88 as shown in FIG. 7. The process is similar if the receivers are provided on a curved profile. Data from one or more streamers (see FIG. 8) may be used for the migration and mirror migration. The sea surface 96 is used as a mirror, i.e., instead of "sighting" the seafloor 92, it is the water surface 96 that is "sighted" to see the reflectors 94 located underneath the seismic detectors. In practice, the seismic data in the mirror migration are considered not as having been recorded at the seismic detectors of the streamer, but at an altitude above the water surface equal to the depth of each detector, as illustrated FIG. 7 by fictitious detectors $R_{f1}$ to $R_{fn}$, each corresponding to a real detector. In other words, a detector $R_2$ is considered for the mirror migration to be (fictitiously) located at $R_{f2}$, the mirror image of $R_2$ relative to the surface of the water 96. This is known in the art as the principle of reciprocity and this principle gives fictitious consideration to the detectors.

Figure 3:
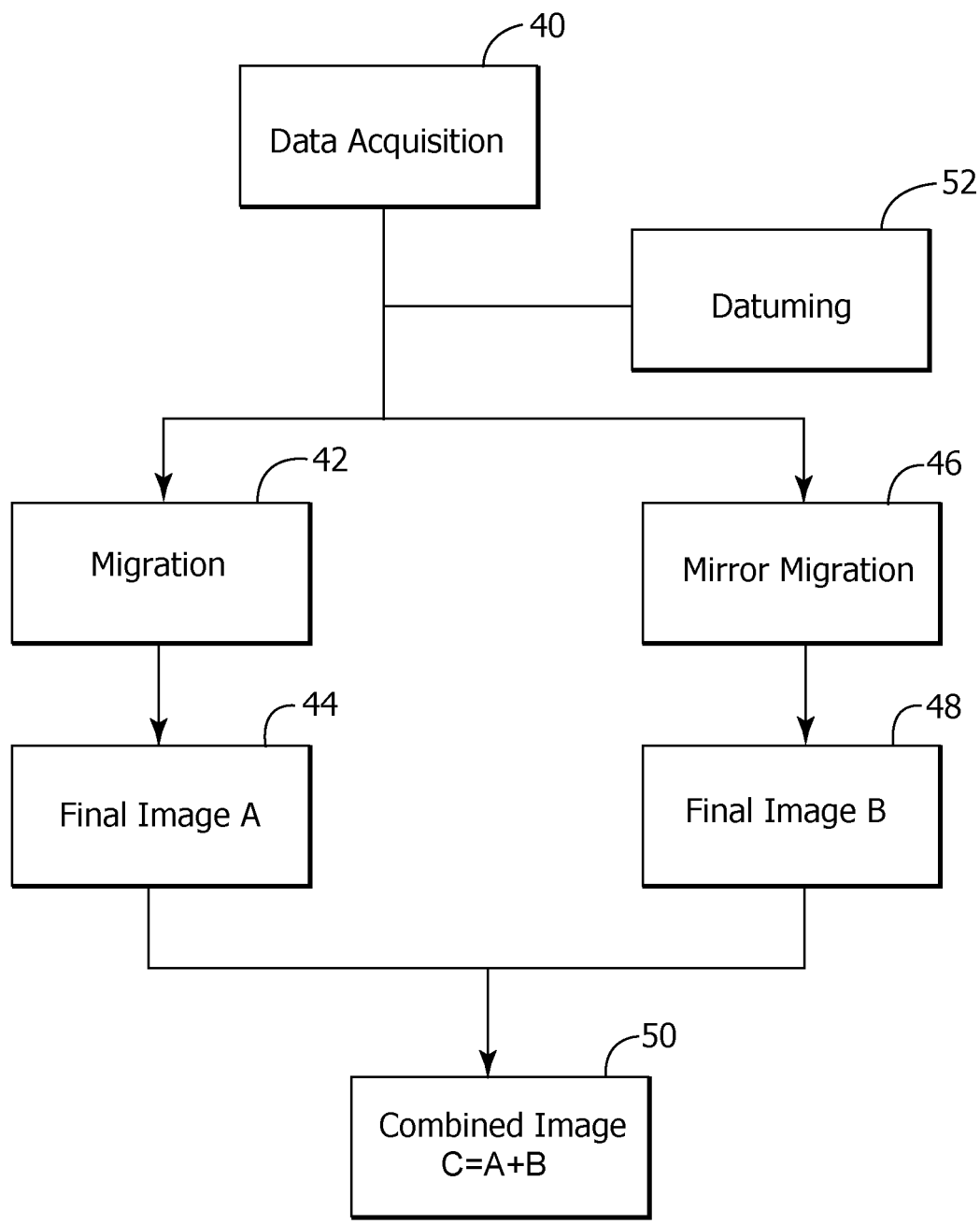
FIG. 3 is a flow chart illustrating a conventional image forming algorithm.

Mirror migration includes using only the fictitious ghost source to obtain the final image. Having obtained a final image B from the mirror migration, the final image A of the migration is added to the final image B of the mirror migration to obtain a single final image as illustrated by the step 50 of FIG. 3.

However, it is noted that from the point of view of computational resources, the one-way wave equation has to be solved for U and D for both the migration and mirror migration processing, which increases the processing time.

Figure 9:
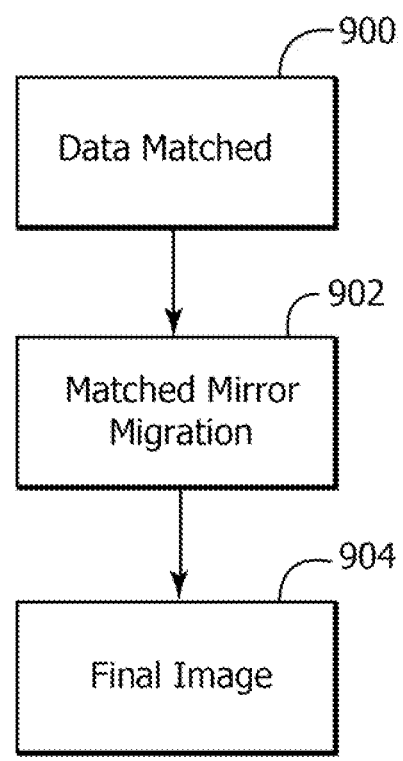
FIG. 9 is a flow chart of a method for processing seismic data according to an exemplary embodiment.

Thus, according to an exemplary embodiment illustrated in FIG. 9, a novel processing method is provided that reduces the processing time. This novel processing method, matched mirror migration, is so-called by analogy with the mirror migration and a matched filter used for signal processing (the matched filter including a measurement s(t), which is perturbed by convolution with a h(t) filter, by using h(−t) so as to optimize the signal-to-noise ratio).

Figure 8:
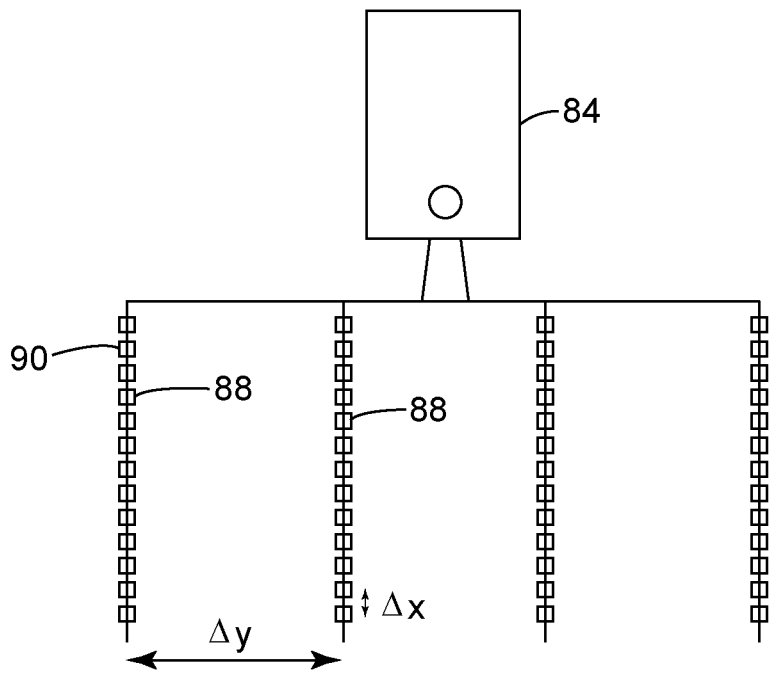
FIG. 8 illustrates an array of detectors for collecting three-dimensional seismic data for processing.

The matched mirror migration may be applied to data collected from a horizontal streamer, slanted streamer or a streamer having a curved profile (or a plurality of such streamers as shown in FIG. 8). The detectors on the streamers are assumed to have spatial coordinates $(x_r, y_r, z_r)$ with respect to an inertial reference system having the X and Y axes extending parallel to the surface of the water and the Z axis entering into the water. The reflected wave U (assumed to be up-travelling) is initialized for this novel process with at an altitude of $-z_{max}$, where $z_{max}$ is a maximum depth of the seismic detectors (the maximum of all $z_r$) and altitude 0 corresponding to the water surface as shown in FIG. 7.

During the recursive downward movement at z of the wave U, between values $-z_{max}$ and 0, the recording of the detector under consideration (at z) is added with a sign change at the mirror position relative to the sea surface, i.e., at $(x_r, y_r, -z_r)$. In one application all the detectors are added in this way to the wave U.

Continuing downwards along the Z axis to calculate U from z=0 to $z_{max}$, the recordings of the detectors under consideration are added at their real positions $(x_r, y_r, z_r)$. Thus, according to the novel method, the recordings of the detectors are added in the same run of the wave equation at mirror positions (e.g., above the surface of the water with a changed sign) and at actual positions with the recorded sign. In this way, instead of running twice the wave equations for the migration process and the mirror migration process, as in the conventional methods, the method described in this exemplary embodiment runs only once the wave equations in the matched mirror migration process by taking into account both the actual detectors and the fictitious detectors in the same run.

In one embodiment, the remainder of the recursive calculation of U, the generation of the incident wave D (assumed to be down-travelling) and the cross-correlation step between the incident and reflected waves to obtain the final image, may be conducted in a similar manner to the conventional one-way migration. Thus, as illustrated in FIG. 9, data collection (acquisition) may take place in step 900. Then, the matched mirror migration is applied in step 902. A final image is generated in step 904. Comparing this method with the one shown in FIG. 3, it is noted that neither the migration nor the mirror migration are performed, thus, saving computer processing power and time. It is also noted that the matched mirror migration illustrated in FIG. 9 is different from the mirror migration illustrated in FIG. 3 and discussed with reference to FIG. 6 as the matched mirror migration considers the recordings of the same detectors at two different locations with different signs.

In other words, a difference between the mirror migration of FIG. 6 and the matched mirror migration of FIG. 9 is that, instead of initializing the U function from $Z_1$ to $Z_{max}$ (see FIGS. 6 and 7), the U function is initialized from $-Z_{max}$ to $Z_{max}$ and the recordings of the detectors between the $-Z_{max}$ and 0 undergo a sign change when added to the U function. Thus, it is noted that the mirror migration method of FIG. 6 does not include the detectors from 0 to $Z_{max}$.

In this manner, the image of the subsurface may be obtained directly from 3D acquisitions by curved streamers or slanted streamers, taking into account the positions of the detectors and the 3D propagation of the waves. The same is true for the traditional streamers. In one application, the matched mirror migration is applied to data received from receivers that are provided on a curved profile while being towed underwater. In this regard, it is noted that most of the traditional methods are not capable of handling data recorded at points provided on a curved profile unless a datuming is performed. However, the method discussed above is capable of handling this kind of data without any datuming.

An advantage of this exemplary embodiment is that the step during which recordings are added at the mirror positions of the detectors has a low extra cost (in terms of computer processing power) but provides a strengthening of the signal-to-noise ratio of an image generated based on the ghost detectors, without doubling the migration calculation time which is the case when two images A and B are calculated and then stacked as currently performed in the art and illustrated in FIG. 4. However, in one application, the image obtained by the matched migration process may be combined with the image of the traditional migration for obtaining the final image.

A further advantage of one or more of the embodiments discussed above is that, contrary to existing methods, no datuming step is necessary for reconstructing seismic data which would have been recorded by a horizontal streamer, prior to the migration step.

It is noted that the processing method described in FIG. 9 takes into account the angles of propagation at both X and Y axes and also makes it possible to improve the signal-to-noise ratio by using ghost data to reinforce primary reflection data. Thus, in one exemplary embodiment, the ghost data is not filtered out as in the traditional methods but rather combined with the primary data for enhancing the final image.

In an exemplary embodiment, if the diversity of depths of the sensors does not permit ghost waves to be fully eliminated, the resulting perturbation on end data is convoluted by a filter that is symmetrical (zero phase) and can be deconvoluted (no notch). This deconvolution step is simplified by the fact that it is a zero phase deconvolution. Thus, in one application, the matched mirror migration may be combined with the zero-phase deconvolution for determining the final image.

The description of the matched mirror migration given above concerns the case of a 3D migration for the "one-way" shot point. However, there are other types of migrations which can be matched similar to the matched mirror migration by adding to the calculation of the reflected wave, in addition to the recordings of the detectors at their actual positions, the opposite recordings at their mirror positions.

For example, there is a 3D migration per shot point called "Reverse Time Migration" which does not assume that the incident wave is a down-travelling wave and the reflected wave an up-travelling wave. Further, the Reverse Time Migration method solves the full acoustic wave equation. In this case, the matched mirror migration may be performed by adding the detectors at their actual position $(x_r, y_r, z_r)$ but by using at the water surface the so-called free-surface boundary conditions instead of the usually used absorbing boundary conditions. The free-surface boundary conditions assumes that no wave travels in the second medium thus corresponding to a "−1" reflection coefficients while the absorbing boundary condition assumes that no wave is reflected (reflection coefficient 0).

The methods described above are not limited to the processing of data acquired using linear streamers of a constant slant as shown in FIG. 5. The methods may be applied to data gathered by streamers including several sections of different slants, or by streamers having one or more slanted sections and one or more horizontal sections, or by horizontal streamers located at different depths, or by streamers having curved profiles.

Figure 10:
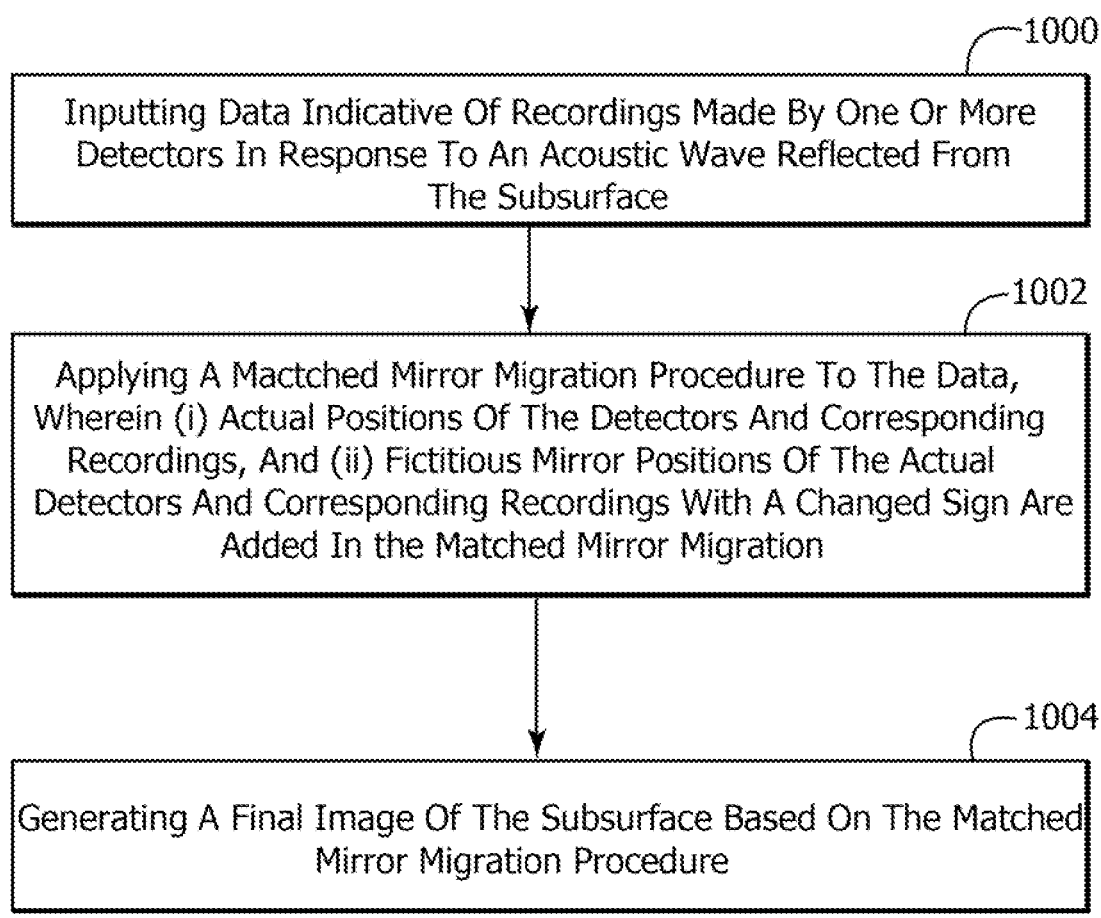
FIG. 10 is a flow chart of a method for processing seismic data based on an matched mirror migration according to an exemplary embodiment.

According to an exemplary embodiment illustrated in FIG. 10, there is a method for processing seismic data related to a subsurface of a body of water. The method includes a step 1000 of inputting data indicative of recordings made by detectors provided on a curved profile in response to an acoustic wave reflected from the subsurface; a step 1002 of applying an matched mirror migration procedure to the data, where (i) actual positions of the detectors on the curved profile and corresponding recordings, and (ii) fictitious mirror positions of the actual detectors on the curved profile and corresponding recordings with a changed sign are added in the matched mirror migration; and a step 1004 of generating a final image of the subsurface based on the matched mirror migration procedure.

Figure 11:
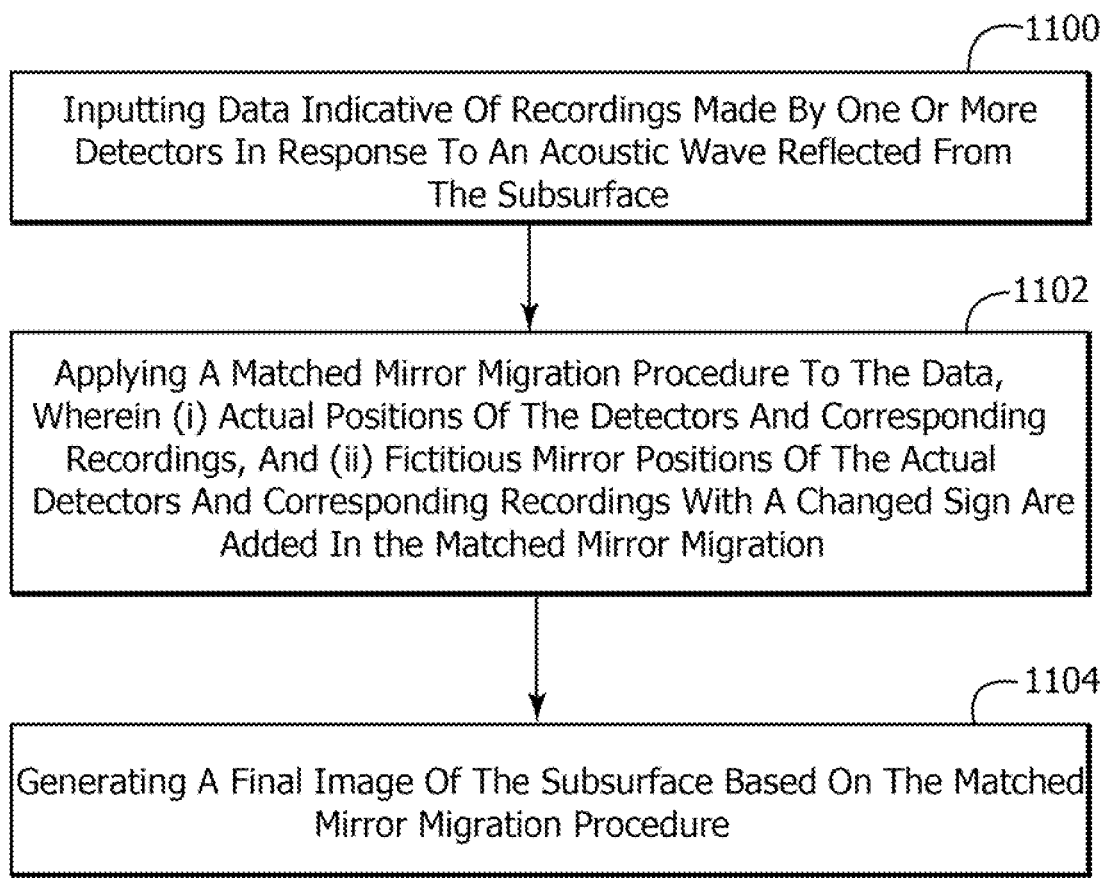
FIG. 11 is a flow chart of a method for processing seismic data, using a reverse time migration, based on an matched mirror migration according to an exemplary embodiment.

According to another exemplary embodiment illustrated in FIG. 11, there is a method for processing seismic data related to a subsurface of a body of water. The method includes a step 1100 of inputting data indicative of recordings made by detectors provided on a curved profile in response to an acoustic wave reflected from the subsurface; a step 1102 of applying a reverse time migration procedure for calculating a final image of the subsurface, where the reverse time migration procedures solve the full acoustic wave equation; and a step 1104 of using free-surface boundary conditions for a surface of the water instead of absorbing boundary conditions to calculate the final image. The free-surface boundary conditions assume that a wave is reflected at the surface of the water while the absorbing boundary conditions assume that the wave moves from the water into air at the surface of the water.

Figure 12:
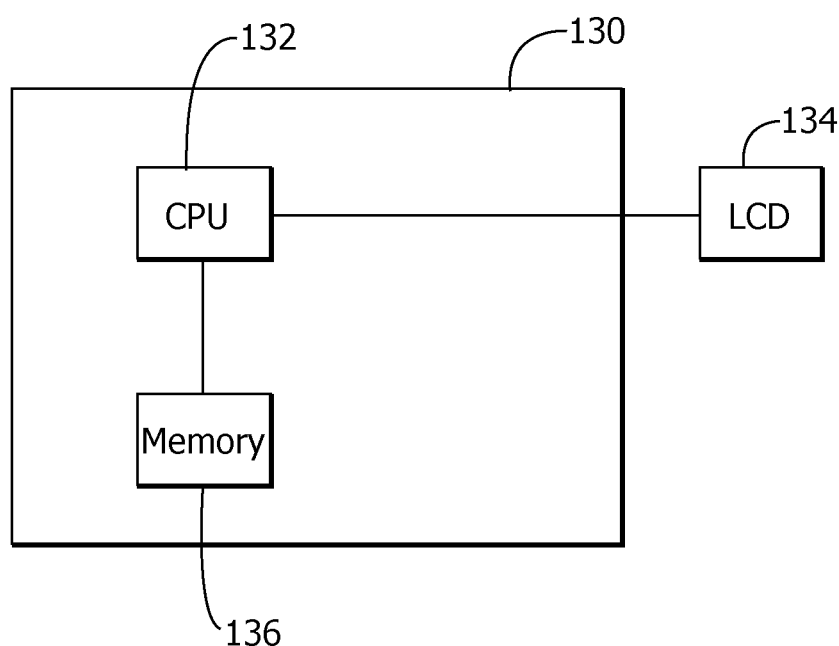
FIG. 12 is a schematic diagram of an apparatus configured to run the matched mirror migration.

The above methods may be implemented into an apparatus, e.g., a computer, in software or a combination thereof. Such an apparatus 130 is illustrated in FIG. 12 and may include a processor 132 for performing the processing discussed above and a monitor 134 for displaying the results of the processing. The apparatus 130 may also include a storage device 136 for storing necessary instructions and/or data. Apparatus 130 may include other components as known by those skilled in the arts. The apparatus 130, by being programmed to calculate the specific steps of the matched mirror migration discussed above, is not a general user computer.

The disclosed exemplary embodiments provide an apparatus and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing seismic data related to a subsurface of a body of water, the method comprising:
    inputting data indicative of recordings made by detectors disposed on a depth-changing profile in response to an acoustic wave reflected from the subsurface;
    applying a matched mirror migration procedure to the data, wherein the matched mirror migration procedure uses an up-traveling U wave and a down-traveling D wave, at least one of the up-traveling U wave or the down-traveling D wave being constructed based on (i) actual positions of the detectors disposed on the depth-changing profile and corresponding recordings, and (ii) fictitious mirror positions of the actual detectors on the depth-changing profile and corresponding recordings with a changed sign; and
    generating in a processor an image of the subsurface based on the matched mirror migration procedure.

2. The method of claim 1, wherein the up-traveling U wave travels from reflectors in the subsurface to the detectors.

3. The method of claim 1, further comprising:
    time cross-correlating the U wave with the D wave to generate the image of the subsurface,
    wherein the U wave travels from reflectors in the subsurface to the detectors and the D wave travels from a sound source to the subsurface.

4. The method of claim 1, wherein the step of calculating the down-travelling D wave does not take into consideration the fictitious mirror positions of the actual detectors and the corresponding recordings with a changed sign.

5. The method of claim 1, wherein the U wave and the D wave are calculated regressively based on a wave equation.

6. The method of claim 1, wherein a one-way wave equation is used to calculate the image.

7. The method of claim 1, wherein no image from a migration step is added to the image of the matched mirror migration.

8. The method of claim 1, wherein a step of datuming is not performed prior to calculating the final image, wherein datuming implies using data from the detectors provided at positions $(x_n, z_n)$, where $n=1, \ldots N$ and N is a natural number, and synthesizing data that would have been recorded by the detectors if they had been placed at the same horizontal positions $x_n$ but at a same constant reference depth $z_0$ for all the detectors.

9. The method of claim 1, wherein the data are collected from detectors being towed by a vessel and the detectors are submerged in water and distributed on the depth-changing profile underwater.

10. The method of claim 9, wherein the depth-changing profile is a hyperbola.

11. The method of claim 1, further comprising:
calculating the up-travelling U wave from an initial altitude $-z_{max}$, where $z_{max}$ is a maximum depth of the detectors;
reverse propagating the up-travelling U wave from the initial altitude by a depth recursive calculation in which the up-travelling U wave is calculated at a current depth $z+\Delta z$ from an up-travelling wave for a preceding depth z; and
adding the detectors having a depth $z_r$ or a mirror depth $-z_r$ at a current $z+\Delta z$ position of the up-travelling U wave when the detectors lie between z and $z+\Delta z$.

12. The method of claim 11, further comprising:
propagating the down-travelling D wave emitted by a source of the acoustic wave, wherein the propagation is started at a depth equal to a depth of the source $z_s$, and the propagation of the down-travelling D wave is carried out to obtain down-travelling waves for all depths greater than the depth of the source $z_s$.

13. The method of claim 12, further comprising:
correlating the down-travelling D wave and the up-travelling U wave for each depth greater than the depth of the source $z_s$.

14. A method for processing seismic data related to a subsurface of a body of water, the method comprising:
inputting data indicative of recordings made by detectors disposed on a depth-changing profile in response to an acoustic wave reflected from the subsurface;
applying a matched mirror migration procedure to the data, wherein the matched mirror migration procedure uses a time migration procedure for calculating a reflected wave based on both (i) actual positions of the detectors disposed on the depth-changing profile and corresponding recordings, and (ii) fictitious mirror positions of the actual detectors on the depth-changing profile and corresponding recordings with a changed sign;
using free-surface boundary conditions for a surface of the water instead of the absorbing boundary conditions, wherein the free-surface boundary conditions assume that a wave is reflected at the surface of the water while the absorbing boundary conditions assume that the wave moves from water into air at the surface of the water; and
generating in a processor an image of the subsurface based on the matched mirror migration procedure.

15. A computer program-implemented method for processing seismic data related to a subsurface of a body of water, the method comprising:
inputting data indicative of recordings made by detectors provided on a depth-changing profile in response to an acoustic wave reflected from the subsurface;
applying a matched mirror migration procedure to the data, wherein the matched mirror migration procedure uses an up-traveling U wave and a down-traveling D wave, at least one of the up-traveling U wave or the down-traveling D wave being constructed based on (i) actual positions of the detectors and corresponding recordings, and (ii) fictitious mirror positions of the actual detectors and corresponding recordings with a changed sign; and
generating in the computer an image of the subsurface based on the matched mirror migration procedure.

* * * * *